US012797856B2

(12) United States Patent
Lasorella et al.

(10) Patent No.: US 12,797,856 B2
(45) Date of Patent: Nov. 17, 2026

(54) BASE STRUCTURE FOR SAMPLE ANALYZING APPARATUS

(71) Applicant: SEEGENE, INC., Seoul (KR)

(72) Inventors: Michael Lasorella, Narre Warren (AU); Tibor Eres, Keysborough (AU)

(73) Assignee: SEEGENE, INC., Seoul (KR)

( * ) Notice: Subject to any disclaimer, the term of this patent is extended or adjusted under 35 U.S.C. 154(b) by 595 days.

(21) Appl. No.: 18/140,301

(22) Filed: Apr. 27, 2023

(65) Prior Publication Data

US 2024/0359188 A1 Oct. 31, 2024

(51) Int. Cl.
*B01L 9/00* (2006.01)
*B01L 7/00* (2006.01)

(52) U.S. Cl.
CPC ................. *B01L 9/527* (2013.01); *B01L 7/52* (2013.01); *B01L 2200/025* (2013.01); *B01L 2300/18* (2013.01)

(58) Field of Classification Search
None
See application file for complete search history.

(56) References Cited

U.S. PATENT DOCUMENTS 4,683,195 A 7/1987 Mullis et al.
4,683,202 A 7/1987 Mullis
4,800,159 A 1/1989 Mullis et al.
6,937,351 B1 * 8/2005 Weaver .................... G01B 9/04 356/614
8,236,504 B2 8/2012 Kordunsky et al.
2002/0148392 A1 * 10/2002 Wells .................. A61C 9/0093 108/1
2005/0136534 A1 * 6/2005 Austin ............... G01N 35/1009 427/2.11
2011/0273706 A1 * 11/2011 Noblett ................... B01L 9/523 356/244
2019/0076848 A1 * 3/2019 Belz ........................ B01L 9/523
2023/0279326 A1 * 9/2023 Taylor ................... B23B 31/404 356/244
2023/0338959 A1 * 10/2023 Simmat ..................... B01L 9/52

FOREIGN PATENT DOCUMENTS

JP 2001350102 A * 12/2001
WO WO-2021242176 A1 * 12/2021 ........ B01L 3/502715

* cited by examiner

*Primary Examiner* — Maris R Kessel
*Assistant Examiner* — May Leung Chiu
(74) *Attorney, Agent, or Firm* — Harness, Dickey & Pierce, P.L.C.

(57) ABSTRACT

A base structure for a sample analyzing apparatus according to the present disclosure includes: an upper base portion for supporting a thermal module configured to hold a plurality of reaction vessels; and a lower base portion aligned with the upper base portion at the center axis via a central support member, the central support member configured to keep the upper base portion and the lower base portion together, wherein the upper base portion is tiltable with respect to the lower base portion, and the upper base portion tilts to a leveled state as the upper base portion and the lower base portion are pressed together.

16 Claims, 8 Drawing Sheets

BASE STRUCTURE FOR SAMPLE ANALYZING APPARATUS

TECHNICAL FIELD

The present disclosure relates to a base structure for a sample analyzing apparatus.

BACKGROUND

Recently, people's interest in health have been growing along with prolonged human life expectancy. Thus, the importance of accurate analysis of pathogens and in vitro nucleic acid-based molecular diagnosis such as genetic analysis for a patient has increased significantly, and the demand therefor is on the rise.

Generally, nucleic acid-based molecular diagnosis is performed by extracting nucleic acids from a sample and confirming whether a target nucleic acid is present in the extracted nucleic acids.

The most widely used nucleic acid amplification reaction, which is well-known as a Polymerase Chain Reaction (PCR), repeats a cyclic process which includes denaturation of a double-stranded DNA, annealing of an oligonucleotide primer with a denatured DNA template, and extension of the primer by a DNA polymerase (Mullis et al.; U.S. Pat. Nos. 4,683,195, 4,683,202 and 4,800,159; Saiki et al., (1985) Science 230, 1350-1354).

Recently, various nucleic acid amplification apparatuses have been developed for performing nucleic acid amplification reactions. In the prior art, such apparatuses are configured to mount a vessel containing a sample solution including a template nucleic acid in one reaction chamber, and to perform a nucleic acid amplification reaction by repeatedly heating and cooling the vessel.

In order to amplify a deoxyribonucleic acid (DNA) having a specific nucleotide sequence, the apparatus for a nucleic acid amplification reaction may perform a denaturing step, an annealing step, and an extension (or amplification) step.

The DNA denaturation is performed at about 95° C., and the annealing and extension of primers are performed at a temperature of 55° C. to 75° C. which is lower than 95° C. Light sources emit excitement light to samples, and fluorescent materials in the samples which are excited by the excitation light emit fluorescence. Detectors are configured to sense the emission light emitted from the fluorescent materials to analyze amplification reaction.

According to conventional detection methods and apparatuses, rapid and accurate temperature changes are needed in order for nucleic acid amplification reactions to take place and a sequence of temperature-sensitive steps is repeated a multiple of times to obtain a quantity large enough for analysis.

In order to perform a nucleic acid amplification reaction on a plurality of samples, various reaction vessels may be used, but in many applications, a multi-well plate or plate-like structure or individual plastic tubes held together by a tube rack or support, or a thermal block is used for simultaneously equilibrating all samples to a common thermal environment. For example, the reaction vessels may be sample wells arranged in rows and columns on a multi-well plate: 4×4 for 16 wells, 4×8 for 32 wells, 8×8 for 64 wells, 8×12 for 96 wells, 16×24 for 384 wells and so on for larger plates.

Typically, reaction vessels are placed in close contact with a thermal block which is heated and cooled by a thermoelectric device. In order to keep the reaction vessels in close contact with the thermal block to achieve maximal heat transfer, force is applied to the reaction vessels to press the reaction vessels against the thermal block. Here, it is important for the force to be applied evenly to achieve uniform temperature control and minimal thermal resistance. Further, the applied force also helps seal the reaction vessels during the pressure changes that result from the heating and cooling stages of the thermal cycling.

A heating element, such as a heated lid may be used for such purposes. That is, a heated lid may be used to prevent evaporation or condensation of the samples in the reaction vessels by heating the upper part of the reaction vessel.

In particular, the reaction efficiency in each step of the PCR reaction may vary depending on the temperature deviation that may occur continuously between wells. Such temperature deviation may cause the amplification reaction to proceed with different efficiencies for a plurality of samples in different wells. Since the nucleic acid strand generated in the previous cycle becomes a template for the next cycle and the PCR reaction repeats the nucleic acid amplification reaction for several dozen cycles, uniform temperature control while minimizing the temperature deviation between the plurality of reaction vessels is very much needed.

In general, conventional apparatuses are configured to have a pressure plate used for applying force onto the plurality of reaction vessels to help with the leveling of the contact between the thermal block and reaction vessels. Usually, coil springs are used to assist in transmitting and leveling the force originating from a clamp motor which is imposed by the pressure plate on the reaction vessels and the thermal block.

However, having just the coil springs at each corner of the pressure plate would lead to less pressure applied to the inner area away from the corners, which would eventually result in uneven contact between the reaction vessels and the thermal block.

Therefore, it is necessary to develop an improved apparatus that allows uniform temperature control while minimizing the temperature deviation between the plurality of reaction vessels by ensuring level force distribution for a more uniform contact between the reaction vessels and the thermal block.

PRIOR ART DOCUMENT

Patent Document (Patent document 1) U.S. Pat. No. 8,236,504 (Aug. 7, 2012)

SUMMARY

Technical Task

Embodiments of the present disclosure provide an improved base structure that can be used for uniform temperature control in a thermal cycling apparatus that enables stable leveling of a thermal module.

The technical tasks to be solved by the present disclosure are not limited to the aforementioned technical task.

Means for Solving the Task

According to one aspect of the present disclosure, a base structure for a sample analyzing apparatus may include: an upper base portion for supporting a thermal module configured to hold a plurality of reaction vessels; and a lower base portion aligned with the upper base portion at the center axis via a central support member, the central support member configured to keep the upper base portion and the lower base portion together, wherein the upper base portion is tiltable with respect to the lower base portion, and the upper base portion tilts to a leveled state as the upper base portion and the lower base portion are pressed together.

According to another aspect of the present disclosure, the central support member may include an aligning member that exerts counterforce that partially counteracts a force that causes the upper base portion to tilt.

According to another aspect of the present disclosure, the central support member may include a support body for holding the aligning member in place.

According to another aspect of the present disclosure, the aligning member may be a coil spring.

According to another aspect of the present disclosure, the support body may have a fixed end and a free end, the fixed end of the support body fixed to any one of the upper base portion or the lower base portion, and the free end of the support body holding the aligning member such that the counterforce is exerted on the other one of the upper base portion or the lower base portion.

According to another aspect of the present disclosure, the free end of the support body may have a protruding edge for holding the aligning member.

According to another aspect of the present disclosure, the upper base portion may have a lower surface that is at least partially inclined downwards towards the center axis.

According to another aspect of the present disclosure, the lower base portion may have an upper surface that is at least partially curved and in contact with the lower surface of the upper base portion.

According to another aspect of the present disclosure, the lower base portion may have a plurality of ball units embedded therein, such that the plurality of ball units is in contact with the lower surface of the upper base portion.

According to another aspect of the present disclosure, the plurality of ball units may be in contact with the lower surface of the upper base portion that is at least partially inclined.

According to another aspect of the present disclosure, the lower base portion may have an upper surface that is at least partially inclined upwards towards the center axis.

According to another aspect of the present disclosure, the upper base portion may have a lower surface that is at least partially curved and in contact with the upper surface of the lower base portion.

According to another aspect of the present disclosure, the upper base portion may have a plurality of ball units embedded therein, such that the plurality of ball units is in contact with the upper surface of the lower base portion.

According to another aspect of the present disclosure, the plurality of ball units may be in contact with the upper surface of the lower base portion that is at least partially inclined.

According to another aspect of the present disclosure, the lower base portion or the upper base portion may include a plurality of ball units that are evenly spaced from each other around the center axis.

According to another aspect of the present disclosure, the apparatus may further include a floor portion, wherein the lower base portion is supported by spacers, each spacer for adjusting a distance between the lower base portion and the floor portion.

According to another aspect of the present disclosure, the spacers may each include: a fastening member connected to the lower base portion and configured to engage the floor portion, and an elastic member provided between the lower base portion and the floor portion for elastically supporting the lower base portion.

According to another aspect of the present disclosure, the upper base portion may include a position guide, and the lower base portion comprises a position hole in which the position guide is at least partially enclosed.

According to another aspect of the present disclosure, the upper base portion may include a first position guide and a second position guide, and the lower base portion comprises a first position hole and a second position hole, the first and second position guides at least partially enclosed by the first and second position holes, respectively.

Effect of Invention

According to the embodiments of the present disclosure, it is possible to provide uniform temperature control with an improved base structure that enables stable leveling of a thermal module as an upper base portion and a lower base portion are pressed together.

Also, according to the embodiments of the present disclosure, it is unnecessary to manually adjust the height and/or tension of the leveling means for a thermal module because automatic leveling is possible. As a sample plate is removed from the thermal module, the upper base portion may return to its initial leveled state via a central support and aligning member. Therefore, even after repetitive use of the thermal module with the placement and removal of sample plates, the thermal module can always maintain its leveled state. This plays an important role especially in full automation systems, where sample plates are placed by robot arms. In full automation systems, if a thermal block is left unbalanced due to previous use, it can lead to undesirable errors and results. According to the embodiments of the present disclosure, such problems can be prevented.

DETAILED DESCRIPTION

Figure 1:
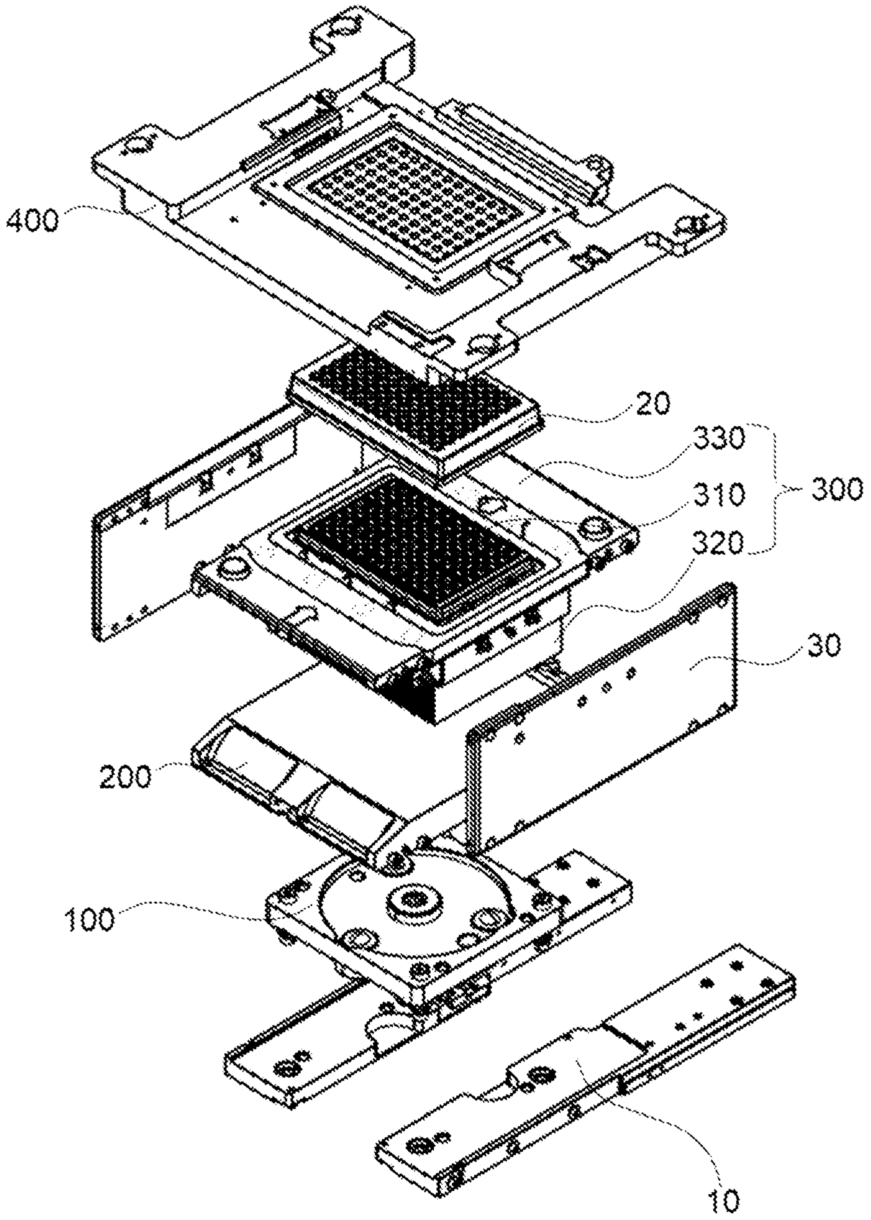
FIG. 1 is an exploded perspective view illustrating parts of a sample analyzing apparatus which includes a base structure according to an embodiment of the present disclosure.

Hereinafter, the present disclosure will be explained with reference to embodiments and example drawings. The embodiments are for illustrative purposes only, and it should be apparent to a person having ordinary knowledge in the art that the scope of the present disclosure is not limited to the embodiments.

In addition, in adding reference numerals to the components of each drawing, it should be noted that same reference numerals are assigned to same components as much as possible even though they are shown in different drawings. In addition, in describing the embodiments of the present disclosure, when it is determined that a detailed description of a related well-known configuration or function interferences with the understanding of the embodiments of the present disclosure, the detailed description thereof will be omitted.

In addition, in describing the components of the embodiments of the present disclosure, terms such as first, second, A, B, (a), (b), (i), (ii), etc. may be used. These terms are only for distinguishing the components from other components, and the nature or order of the components is not limited by the terms. When a component is described as being "connected," "coupled" or "fastened" to other component, the component may be directly connected or fastened to the other component, but it will be understood that another component may be "connected," "coupled" or "fastened" between the components.

The present disclosure relates to an apparatus for analyzing samples, and more particularly an apparatus that can be used in an apparatus or system for detecting a target analyte in a sample.

As used herein, the term "sample" may include a biological sample (e.g., cells, tissues and fluids from a biological source) and a non-biological sample (e.g., food, water and soil). Examples of the biological sample may include viruses, bacteria, tissues, cells, blood (e.g., whole blood, plasma and serum), lymph, bone marrow fluid, saliva, sputum, swab, aspiration, milk, urine, feces, ocular fluid, semen, brain extract, spinal fluid, joint fluid, thymus fluid, bronchoalveolar lavage fluid, ascites and amniotic fluid. Also, the sample may include natural nucleic acid molecules isolated from a biological source and synthetic nucleic acid molecules. According to an embodiment of the present disclosure, the sample may include an additional substance such as water, deionized water, saline solution, pH buffer, acid solution or alkaline solution.

A target analyte refers to a substance that is the subject of analysis. The analysis may mean obtaining information on, for example, the presence, amount, concentration, sequence, activity or property of the analyte in the sample. The analyte may include various substances (e.g., biological substance and non-biological substance such as compounds). Specifically, the analyte may include a biological substance such as nucleic acid molecules (e.g., DNA and RNA), proteins, peptides, carbohydrates, lipids, amino acids, biological compounds, hormones, antibodies, antigens, metabolites or cells. According to an embodiment of the present disclosure, the analyte may be nucleic acid molecules.

The sample analyzing apparatus of the present disclosure may be an apparatus for detecting a target nucleic acid. The apparatus for detecting a target nucleic acid allows a nucleic acid reaction to be performed in a sample, to detect a target nucleic acid.

The nucleic acid reaction refers to sequential physical and chemical reactions which generate a signal depending on the presence of a nucleic acid of a specific sequence in the sample or the amount thereof. The nucleic acid reaction may include the binding of a nucleic acid of a specific sequence in a sample to other nucleic acids or substances, or replication, cleavage or decomposition of a nucleic acid of a specific sequence in the sample. The nucleic acid reaction may involve a nucleic acid amplification reaction. The nucleic acid amplification reaction may include amplification of a target nucleic acid. The nucleic acid amplification reaction may specifically amplify the target nucleic acid.

The nucleic acid reaction may a signal-generation reaction which can generate a signal depending on the presence/absence of a target nucleic acid in the sample or the amount thereof. The signal-generation reaction may be a technique of genetic analysis such as PCR, real-time PCR or microarray.

Various methods for generating an optical signal which indicates the presence of a target nucleic acid using a nucleic acid reaction are known. Representative examples thereof include the following: TaqMan™ probe method (U.S. Pat. No. 5,210,015), molecular beacons method (Tyagi et al., Nature Biotechnology v. 14 Mar. 1996), scorpion method (Whitcombe et al., Nature Biotechnology 17:804-807 (1999)), sunrise or amplifluor method (Nazarenko et al., 2516-2521 Nucleic Acids Research, 25(12):2516-2521 (1997), and U.S. Pat. No. 6,117,635), lux method (U.S. Pat. No. 7,537,886), CPT (Duck P, et al., Biotechniques, 9:142-148(1990)), LNA method (U.S. Pat. No. 6,977,295), plexor method (Sherrill C B, et al, Journal of the American Chemical Society, 126:4550-4556(2004)), Hybeacons™ (D. J. French, et al., Molecular and Cellular Probes (2001) 13, 363-374 and U.S. Pat. No. 7,348,141), dual-labeled, self-quenched probe (U.S. Pat. No. 5,876,930), hybridization probe (Bernard P S, et al., Clin Chem 2000, 46, 147-148), PTOCE (PTO cleavage and extension) method (WO 2012/096523), PCE-SH (PTO Cleavage and Extension-Dependent Signaling Oligonucleotide Hybridization) method (WO 2013/115442), PCE-NH (PTO Cleavage and Extension-Dependent Non-Hybridization) method (PCT/KR2013/012312) and CER method (WO 2011/037306).

A base structure for a sample analyzing apparatus according to an embodiment of the present disclosure, may be employed in an apparatus or system for detecting a target analyte such as a nucleic acid. The sample analyzing apparatus according to an embodiment of the present disclosure may be used in an apparatus or system for detecting an optical signal generated depending on the presence of the target nucleic acid. Such apparatus or system may also include a nucleic acid amplifier.

The optical signal may be a luminescence signal, phosphorescence signal, chemiluminescence signal, fluorescence signal, polarized fluorescence signal or other colored signal. The optical signal may be generated in response to an optical stimulus given to the sample.

A nucleic acid amplifier refers to an apparatus for performing a nucleic acid amplification reaction which amplifies a nucleic acid having a specific nucleotide sequence. Examples of the method for amplifying a nucleic acid include polymerase chain reaction (PCR), ligase chain reaction (LCR) (U.S. Pat. Nos. 4,683,195 and 4,683,202; PCR Protocols: A Guide to Methods and Applications (Innis et al., eds, 1990)), strand displacement amplification (SDA) (Walker, et al. Nucleic Acids Res. 20(7):1691-6 (1992); Walker PCR Methods Appl 3(1):1-6 (1993)), transcription-mediated amplification (Phyffer, et al., J. Clin. Microbiol. 34:834-841 (1996); Vuorinen, et al., J. Clin. Microbiol. 33:1856-1859 (1995)), nucleic acid sequence-based amplification (NASBA) (Compton, Nature 350(6313):91-2 (1991)), rolling circle amplification (RCA) (Lisby, Mol. Biotechnol. 12(1):75-99 (1999); Hatch et al., Genet. Anal. 15(2):35-40 (1999)), Q-beta Replicase (Lizardi et al., BiolTechnology 6:1197 (1988)), and loop-mediated isothermal amplification assay (LAMP) (Notomi, T et al., Nucleic Acids Res. 28(12):E63 (2000)), etc.

The above-mentioned nucleic acid amplifier may carry out a denaturing step, an annealing step and an extension (or elongation) step to amplify deoxyribonucleic acid (DNA) having a specific base sequence.

In the denaturing step, a sample and reagent solution containing double-stranded DNA templates is heated to a specific temperature, for example about 95° C., to separate double-stranded DNA into single-stranded DNA. In the annealing step, an oligonucleotide primer having a nucleotide sequence complementary to the nucleotide sequence of a nucleic acid to be amplified is provided, and the primer and the separated single-stranded DNA are cooled down to a specific temperature, for example 60° C., to promote the primer binding to the specific nucleotide sequence of the single-stranded DNA to form a partial DNA-primer complex. In the extension step, the solution is maintained at a specific temperature, for example 72° C., after the annealing step to form double-stranded DNA by DNA polymerase based on the primer of the partial DNA-primer complex.

The aforementioned three steps are repeated, for example 10 to 50 times, geometrically amplifying DNA having the specific nucleotide sequence. In some cases, the nucleic acid amplifier may perform the annealing step and extension step simultaneously. In this case, the nucleic acid amplifier may complete one cycle by performing two steps including a denaturing step and an annealing/extension step.

Particularly, a sample analyzing apparatus configured to have a base structure according to an embodiment of the present disclosure may be used together with such a nucleic acid amplifier for performing a nucleic acid amplification reaction with temperature changes. As the amplification reaction takes place, an optical signal is generated depending on the presence of a nucleic acid and the detection apparatus is capable of detecting the generated optical signal.

FIG. 1 is an exploded perspective view illustrating parts of a sample analyzing apparatus which includes a base structure according to an embodiment of the present disclosure. As shown in FIG. 1, the apparatus may include: an upper base portion 200 for supporting a thermal module 300 configured to hold a plurality of reaction vessels; and a lower base portion 100 aligned with the upper base portion 200.

According to an embodiment of the present disclosure, the plurality of reaction vessels may be a sample plate 20 having 96-sample wells. The apparatus of the present disclosure may include a platform 400 which is lowered down on the sample plate 20, applying force on the sample plate 20 to press it against the thermal module 300. The upper base portion 200 is tiltable with respect to the lower base portion 100, which allows the force to be applied evenly over the sample plate 20 to achieve uniform temperature control and minimal thermal resistance.

More particularly, as the upper base portion 200 and the lower base portion 100 are pressed together, the sample plate 20 may tilt with the thermal module 300 and with the upper base portion 200, until it eventually reaches an optimal leveled state where pressure is evenly distributed on the sample plate 20. Here, the thermal module 300 may be connected to the upper base portion 200 via panels 30.

The thermal module 300 of the present disclosure may be a conventional thermal module used in thermal cycling apparatuses, that includes a thermal block 310 whereon the sample plate 20 is placed. The thermal module 300 may also include the necessary components such as Peltier elements (not shown) and a heatsink 320 for applying specific temperature cycles to the sample plate 20. The thermal module 300 may further include a fan (not shown) and other components well known in the prior arts.

Here, the thermal block 310 may be supported by a frame 330 surrounding the periphery of the thermal block 310, the sides of the frame 330 fixed to panels 30. A heatsink 320 may be disposed under the thermal block 310 which may also be fixed to the panels 30. The panels 30 may be attached to the frame 330 and heatsink 320 and also the upper base portion 200. In this case, when pressure is applied to the thermal block 310, other components attached to the panels 30 may move together with the thermal block 310 as a unit.

Figure 2:
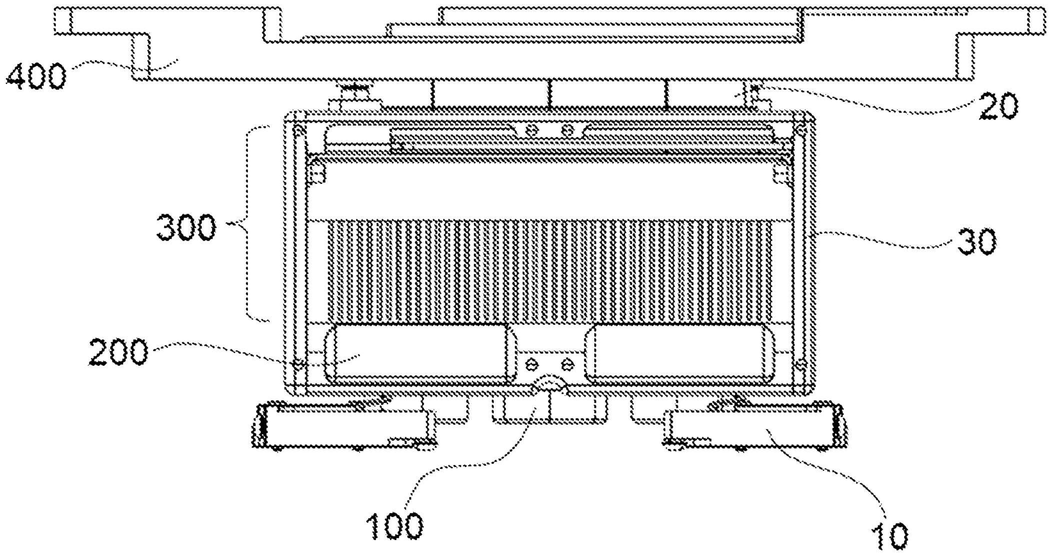
FIG. 2 is a front view illustrating the sample analyzing apparatus of FIG. 1.

FIG. 2 shows a front view of the sample analyzing apparatus of FIG. 1 when the thermal module 300 and upper base portion 200 are connected via panels 30. As shown in FIGS. 1 and 2, the panels 30 may be attached to the sides of the thermal module 300 and the upper base portion 200. The lower base portion 100 may be aligned with the upper base portion 200, and the upper base portion 200 is configured to be tiltable together with the thermal module 300 and the sample plate 20 as the platform 400 presses down on the sample plate 20. Further, the floor portion 10 may be disposed under the lower base portion 100 to support the base portion.

As mentioned above, the thermal module 300, the panels 30, and the upper base portion 200 may be attached so as to move as one unit. On the other hand, the lower base portion 100 may be attached to the floor portion 10, the floor portion 10 configured so as to keep the entire structure grounded stably.

More particularly, as the platform 400 presses down on the sample plate 20, the thermal block 310 may be pressed and in turn be leveled automatically by the tilting movement of the upper base portion 200 relative to the lower base portion 100. That is, as the upper base portion 200 tilts on the lower base portion 100, the panels 30 and all other components attached to the panels 30 may tilt accordingly. Thus, the thermal block 310 may tilt while the sample plate 20 is being pressed against the thermal block 310, which would bring them to close contact with an optimal even pressure applied therebetween.

Here, the platform 400 may be pressed down by various driving mechanisms which are not described in detail in the present disclosure. For example, in some embodiments, the platform 400 may be slidably connected to vertical supports and be driven upwards and downwards by a linear motor.

The aligning and tilting mechanism of the lower base portion 100 and the upper base portion 200 will be described in more detail below.

Figure 3:
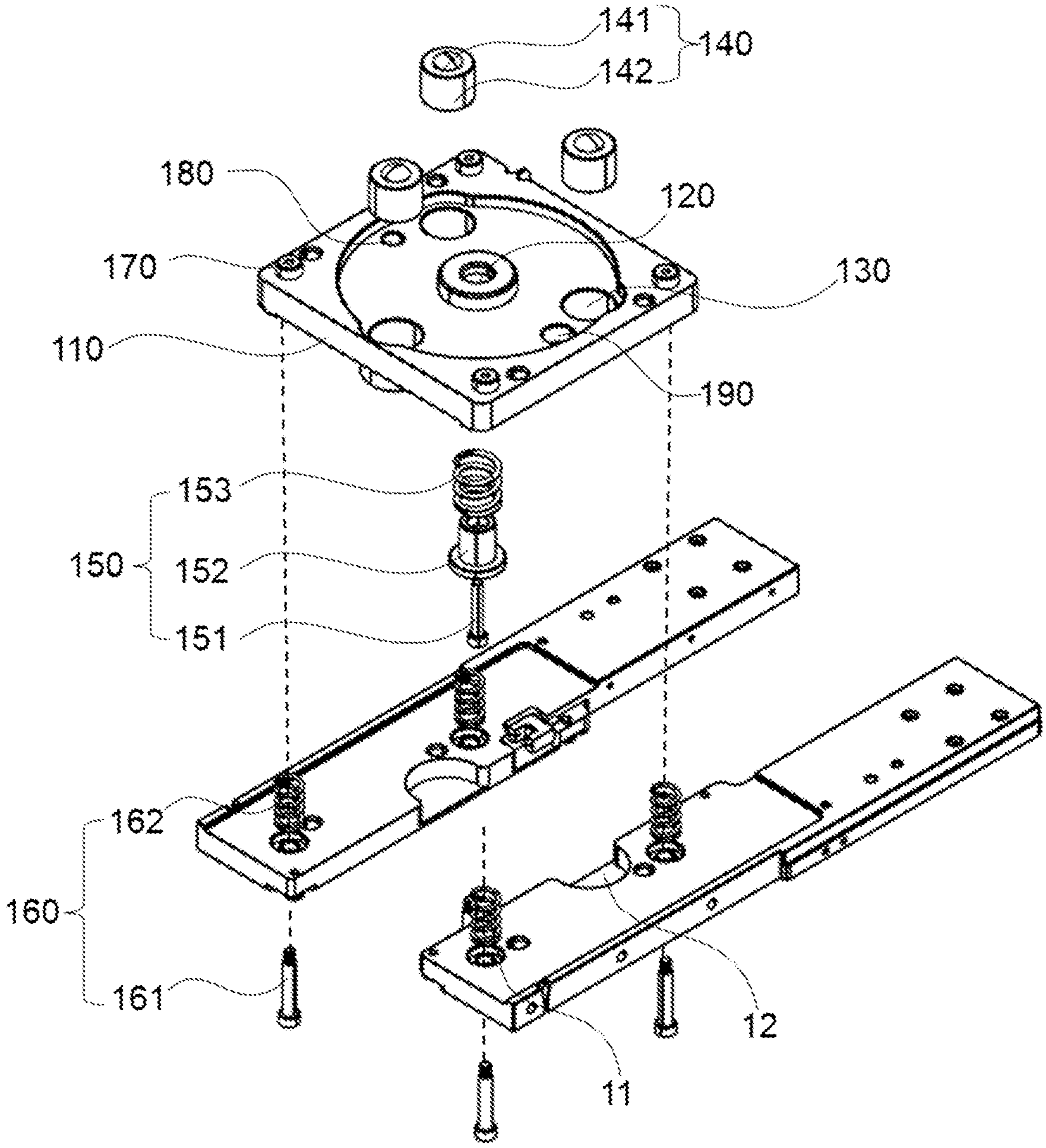
FIG. 3 is an exploded perspective view illustrating a lower base portion of the base structure according to an embodiment of the present disclosure.

FIG. 3 is an exploded perspective view illustrating the lower base portion 100 of the base structure according to an embodiment of the present disclosure. According to an embodiment of the present disclosure, the lower base portion 100 may be aligned with the upper base portion 200 at a center axis via a central support member 150, the central support member 150 configured to keep the upper base portion 200 and the lower base portion 100 together.

As shown in FIG. 3, a lower base plate 110 forms the body of the lower base portion 100. The lower base plate 110 is configured to have a center hole 120 formed at its center. The central support member 150 may be positioned within the center hole 120 formed at the center of the lower base plate 110. A central support member 150 is configured to exert counterforce on the lower base plate 110 which partially counteracts a force that causes the upper base portion 200 to tilt.

That is, the central support member 150 may provide elasticity to the tilting movement of the upper base portion 200, which allows the upper base portion 200 to be kept in contact with the lower base portion 100 during the tilting. More particularly, the central support member 150 may include an aligning member 153 that provides elasticity to the tilting movement of the upper base portion 200. The aligning member 153 is configured to exert counterforce that partially counteracts the force that causes the upper base portion 200 to tilt. For example, the aligning member 153 may be a coil spring.

In some embodiments where the aligning member 153 is a coil spring, the aligning member 153 may be disposed under the lower surface of the lower base portion 100, as shown in FIG. 3, such that as the upper base portion 200 tilts in any one direction, the aligning member 153 may push against the lower surface of the lower base portion 100 in the opposite direction. Thus, the aligning member 153 may be used to exert counterforce that partially counteracts the force that causes the upper base portion 200 to tilt. The counterforce that can be exerted by the aligning member 152 may depend on its elasticity.

Here, the central support member 150 may further include a support body 152 for holding the aligning member 153 in place. The support body 152 may have a fixed end and a free end, wherein the fixed end may be fixed or fitted to the bottom of the upper base portion 200. The free end of the support body 152 may be accommodated in the center hole 120 of the lower baes plate 110, and may be configured to hold and support the aligning member 153. Such configuration allows the upper base portion 200 to tilt with respect to the lower base portion 100, as the upper base portion 200 and the lower base portion 100 are pressed together.

More particularly, the free end of the support body 152 may have a protruding edge where the aligning member 153 may be seated. In this case, the aligning member 152 is disposed between the protruding edge of the support body 152 and the lower base portion 100. That is, as the upper base portion 200 tilts, the aligning member 152 is pressed between the protruding edge of the support body 152 and the lower base portion 100. The elasticity of the aligning member 152 acts to bring the aligning member 152 back to its original state before any deformation.

Thus, the elasticity of the aligning member 153 causes the aligning member 153 to move to counteract the applied pressure at least partially. Such elasticity can also create tension between the upper base portion 200 and the lower base portion 100 which acts to eventually bring the upper base portion 200 to an optimal leveled state where pressure is evenly distributed on the sample plate 20.

In some embodiments, the central support member 150 may also include a central fastening member 151. The central fastening member 151 may be engaged to the support body 152 such that the support body 152 is more stably fixed to the upper base portion 200. The fastening member 151 may be engaged to the support body 152 on one end and be fixed to the upper base portion 200 on the other. In other embodiments, the support body and the central fastening member 151 may be formed integrally.

In other embodiments, the aligning member 153 is not limited to a coil spring. For example, the aligning member 153 may take form of an elastic band, a molded flexible part made of an elastomer, or some other material that deviates in length and/or shape to exert counterforce.

Although FIG. 3 illustrates the central support member 150 disposed under the lower base plate 110, the position of the central support member 150 is not limited thereto, as long as counterforce can be exerted by the aligning member 153 to at least partially counteract the force that causes the upper base portion 200 to tilt.

That is, the fixed end of the support body 152 may be fixed to any one of the upper base portion 200 or the lower base portion 100, and the position in which the aligning member 153 is placed depends on how the aligning member 153 is configured to exert counterforce when force is applied to the upper base portion 200. For example, in a case where the fixed end of the support body 152 is fixed to the lower base portion 100, and the aligning member 153 is a coil spring, the configuration of the upper base portion 200, lower base portion 100 and the central support member 150 can be described with an upside-down view of FIG. 6. That is, a center hole like that of the center hole 120 of the lower base portion 100 may be formed in the upper base portion 200, and within the center hole, an aligning member like that of the aligning member 153 of the lower base portion may be disposed to be in contact with an inner surface of the upper base portion 200. The inner surface would be a surface formed inside the center hole. In this case, as the upper base portion 200 tilts to one side, the bottom of the aligning member would act to press down on the top of the inner surface of the upper base portion 200 at another side across from the center axis, such that the upper base portion 200 may at least partially tilt back to its original position.

Figure 6:
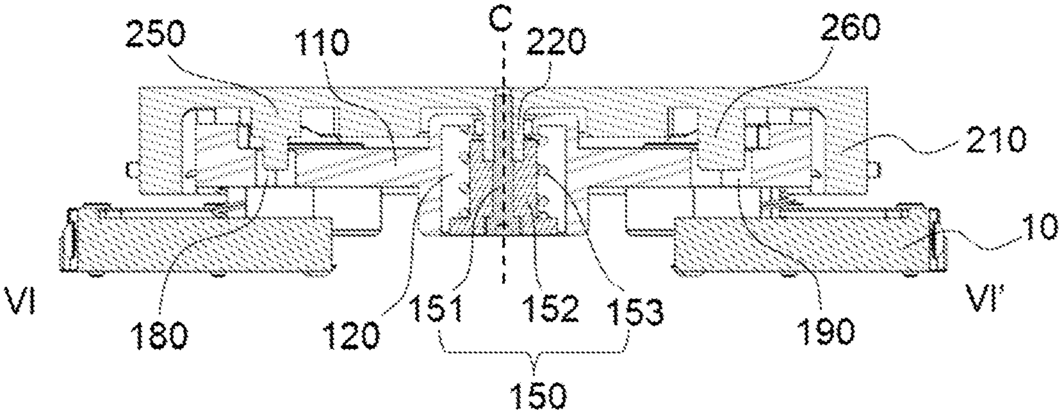
FIG. 6 is a cross-sectional view taken along line VI-VI' in FIG. 5.

That is, when the fixed end of the support body 152 is fixed to the upper base portion 200, one can refer to the embodiment of the present disclosure shown in FIG. 6 where the top of the aligning member 153 would act to push upwards on the inner surface of the lower base portion 100. On the other hand, in the case where the fixed end of the support body 152 is fixed to the lower base portion 100, one can refer to an upside-down view of FIG. 6, where the bottom of the aligning member would act to press down on the top of the inner surface of upper base portion 200.

According to an embodiment of the present disclosure, the lower base plate 110 may have a plurality of ball units 140 embedded therein, such that the plurality of ball units 140 is in contact with the lower surface of the upper base portion 200. The plurality of ball units 140 may be evenly spaced from each other around the center axis where the center hole 120 is formed.

The ball unit 140 may include a curved surface 141. The curved surface 141 may be a portion of a spherical ball, and the ball unit 140 may further include a sleeve 142 surrounding the spherical ball. In this case, the ball unit 140 may be a conventional ball type bearing. That is, the spherical ball may roll within the sleeve 142 to reduce any friction that may occur during the tilting movement of the upper base portion 200.

In some embodiments, the lower base plate 110 may also be configured to have a plurality of receiving spaces 130 for holding a plurality of ball units 140. The receiving spaces 130 may be formed around the center hole 120 and may each be configured to hold a ball unit 140. For example, there may be three receiving spaces 130 for the three ball units 140. In the case where the ball unit 140 is a conventional ball type bearing, the ball unit 140 may be easily inserted and installed in the receiving space 130. In some embodiments, the sleeve 142 of the ball unit 140 may be integrally formed with the receiving space 130.

Further, the receiving space 130 may be formed such that its lower surface protrudes downwards relative to the lower surface of the lower base plate 110. The floor portion 10 may further include side depressions 12 formed such that the lower surface of the receiving space 130 is spaced apart from the floor portion 10. That way, the lower base plate 110 may freely tilt from one spacer 160 to another without any risks of the lower surface of the receiving space 130 colliding with the floor portion 10. That is, the side depressions 12 may be formed as free space to allow the lower surface of the receiving space 130 to move and tilt about the central support member 150 without being restricted by the floor portion 10.

According to an embodiment of the present disclosure, spacers 160 may be provided between the lower base portion 100 and the floor portion 10. The lower base portion 100 may be supported by the spacers 160, each of the spacers 160 for adjusting a distance between the lower base portion 100 and the floor portion 10. The spacers 160 may each include: a fastening member 161 connected to the lower base portion 110 and configured to engage the floor portion 10, and an elastic member 162 provided between the lower base portion 110 and the floor portion 10 for elastically supporting the lower base portion. A spacer 160 may be provided for each corner of the lower base plate 110.

More particularly, each of the spacers 160 may include a fastening member 161 and an elastic member 162 surrounding the fastening member 161. The fastening member 161 of the spacer 160 may be connected to the lower base plate 110 and may be configured to engage the floor portion 10. The fastening member 161 determines the maximum distance between the floor portion 10 and the lower base plate 110.

For example, the fastening member 161 may be a screw that can be tightened on to the lower base plate 110 to shorten the distance between the floor portion 10 and the lower base plate 110. On the other hand, the fastening member 161 may be loosened from the lower base plate 110 to increase the distance between the floor portion 10 and the lower base plate 110.

The elastic member 162 of the spacer 160 may be configured to push the floor portion 10 and the lower base plate 110 apart. For example, the elastic member 162 may be a coil spring that keeps the floor portion 10 spaced apart from the lower base plate 110, but allows the distance between the floor portion 10 and the lower base plate 110 to deviate to some extent depending on the pressure applied thereto.

The floor portion 10 may be provided with spacer receiving portions 11 configured to enclose spacers 160 at least partially. More particularly, the spacer receiving portion 11 may include a recess where the elastic member 162 is at least partially accommodated. The elastic member 162 may be seated on and supported by the surface of the recess of the spacer receiving portion 11. One end of the spacer 160 may be fixed to the lower base plate 110 while the other end of the spacer 160 may be a free end enclosed by the recess of the spacer receiving portion 11.

Further, the spacer receiving portion 11 of the floor portion 10 may include a hole in which the fastening member 161 of the spacer 160 may pass through, but the fastening member 161 may have an end with a protruding edge that engages with the hole of the spacer receiving portion 11. In some embodiments where a screw may be used as the fastening member 161, the head of the screw may be the protruding edge.

That is, when the floor portion 10 and the lower base plate 110 are pushed apart from each other via the elastic member 162, the protruding edge engages with the lower surface of the spacer receiving portion 11, which prevents the fastening member 161 from falling out of the hole of the spacer receiving portion 11. Meanwhile, when the floor portion 10 and the lower base plate 110 are pressed together, the elastic member 162 may be compressed and the fastening member 161 may pass through the hole of the spacer receiving portion 11. Then, the lower base plate 110 is moved upward again by the elasticity of the elastic member 162, consequently providing a damping mechanism for the thermal module 300.

Such spacers 160 may be provided for each corner of the lower base plate 110, and the depth of the fastening member 161 relative to each corner of the lower base plate 110 may be adjusted independently to adjust the lower base plate 110 to be horizontal, thereby preventing the load from the platform 400 from being concentrated on any one side or corner of the sample plate 20. The fastening member 161 may be adjusted manually by a user through the lower side of the floor portion 10.

The spacers 160 also allow the lower base portion 100 to move elastically relatively to the floor portion 10 depending on the pressure applied to the lower base portion 100. More particularly, the elastic member 162 may be compressed or stretched to cushion impact from outside the apparatus. Accordingly, the lower base portion 100 as well as the upper base portion 200 and the thermal module 300 and the sample plate 20 may move upward and downward. This way, the sample plate 20 may be protected from impact.

Further, the lower base plate 110 may also have protrusions 170 formed at its corners, used for maintaining a predetermined alignment between the lower base portion 100 and the upper base portion 200. Such protrusions 170 may be aligned with corresponding features on the upper base portion 200. More particularly, the protrusions 170 may be formed on the upper surface of the lower base plate 110 to be at least partially accommodated by corresponding recesses (see 270 in FIG. 4) formed on the lower surface of the upper base portion 200.

This way, the range of how much the upper base portion 200 can tilt may be stably maintained, as well as the alignment of between the lower base portion 100 and the upper base portion 200. The base structure of the present disclosure may be used for automatically balancing a thermal module in a thermal cycling apparatus, wherein the thermal module may be slid in and out of the apparatus via a drawer-like configuration. Thus, even as the thermal module is drawn in and out of the apparatus, due to the protrusions 170, the lower base portion 100 and the upper base portion 200 may be kept aligned in a stable manner.

The lower base plate 110 may also include a first position hole 180 and a second position hole 190. The first position hole 180 and the second position hole 190 may be formed for accommodating corresponding position guides (see 250 and 260 in FIG. 4) protruding from the upper base portion 200. The first position hole 180 and the second position hole 190 may be formed to have different sizes, for accommodating different sized position guides. Along with the protrusions 170 at each corner of the lower base plate 110 protruding upwards, position guides formed to protrude downwards from the upper base portion 200 may be accommodated in the first position hole 180 and the second position hole 190 to further assist in keeping the lower base portion 100 and the upper portion 200 aligned.

Figure 4:
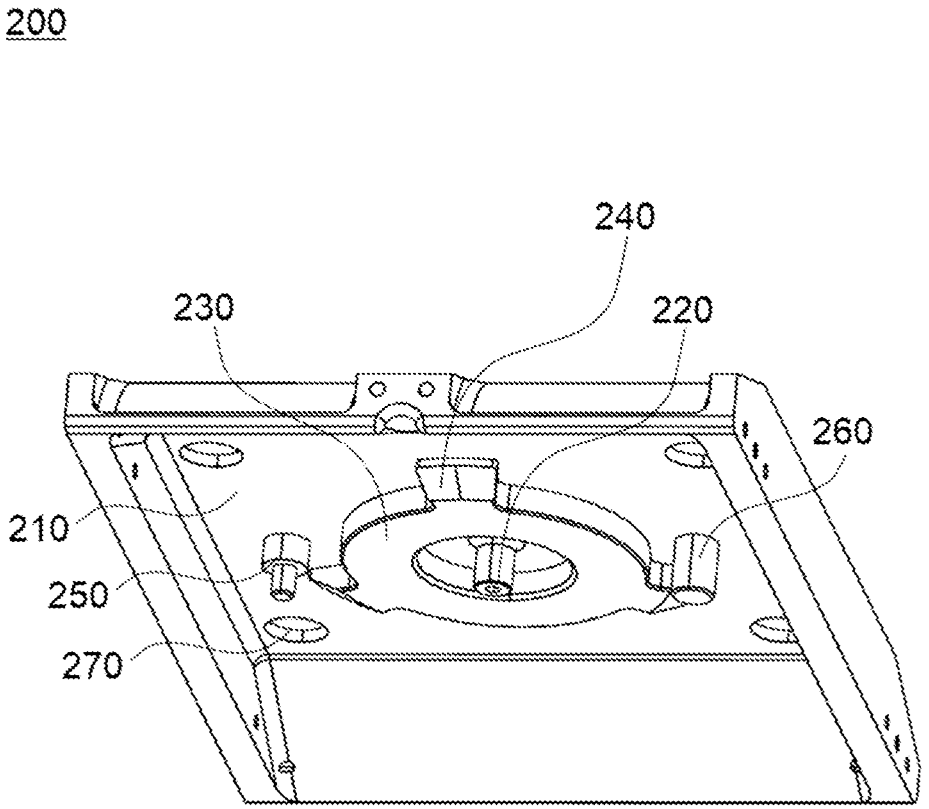
FIG. 4 is a bottom perspective view illustrating an upper base portion of the base structure according to an embodiment of the present disclosure.

Referring to FIG. 4, the configuration of the upper base portion 200 will be described in more detail. FIG. 4 is a bottom perspective view illustrating an upper base portion 200 of the base structure according to an embodiment of the present disclosure. The upper base portion 200 is tiltable with respect to the lower base portion 100, and the upper base portion 200 tilts to a leveled state as the upper base portion 200 and the lower base portion 100 are pressed together.

As shown in FIG. 4, the upper base plate 210 forms the body of the upper base portion 200. The upper base plate 210 is configured to have a central insertion 220 formed at its center. The central insertion 220 may be inserted in the center hole 120 of the lower base plate 100. The support body 152 of the central support member 150 disposed in the center hole 120 may be fixed to the central insertion 220. Thus, as the upper base plate 210 is tilted, the support body 152 may tilt accordingly. Then, the aligning member 153 of the central support member 150 may act to exert counter-force on the lower base plate 110 to eventually bring the upper base portion 200 to an optimal leveled state where pressure is evenly distributed on the sample plate 20.

Also, when the sample plate 20 is removed from the thermal module 300 after thermal cycling, the aligning member 153 of the central support member 150 may act to bring the upper base portion 200 back to its initial leveled state. That is, even in the case where the sample plate 20 is removed from the thermal module 300, the elasticity of the aligning member 153 may act to return the upper base portion 200 to its initial position. Therefore, even after repetitive use of the thermal module 300 with the placement and removal of sample plates 20, the thermal module 300 can always maintain its leveled state.

The upper base portion 200 may have a lower surface that is at least partially inclined downwards towards the center axis. In this case, the lower base portion 100 may have an upper surface that is at least partially curved and in contact with the lower surface of the upper base portion 200. As mentioned above, in the case where the lower base portion 100 may have a plurality of ball units 140, the curved surface 141 of the ball unit 140 may be in contact with the lower surface of the upper base portion 200 that is at least partially inclined. In FIG. 4, the at least partially inclined surface is shown as a sloped surface 240.

As shown in FIG. 4, the sloped surface 240 may be formed on a stepped portion 230 of the upper base portion 200. The stepped portion 230 may be protruding downwards in a ring shape around the central insertion 220. The sloped surface 240 may be formed inclining from the stepped portion 230 to the lower surface of the upper base plate 210. In some embodiments, a plurality of sloped surfaces 240, one for each ball unit 140, may be formed spaced apart evenly from each other and extending from the stepped portion 230. In other embodiments, the sloped surface 240 may be formed in a continuous ring shape extending from the stepped portion and inclining downwards towards the central insertion 220.

In some other embodiments, the lower base portion 100 may have an upper surface that is at least partially inclined upwards towards the center axis. That is, sloped surfaces similar to that of the sloped surfaces 240 shown in FIG. 4 may be formed on the lower base portion 100 instead of the upper base portion 200. In this case, the upper base portion 200 may have a lower surface that is at least partially curved and in contact with the upper surface of the lower base portion 100. Further, when sloped surfaces are formed on the lower base portion 100, the upper base portion 200 may have a plurality of ball units, like that of the above-mentioned plurality of ball units 140 embedded therein, such that the plurality of ball units is in contact with the upper surface of the lower base portion 100. Here, the plurality of ball units may be in contact with the upper surface of the lower base portion 100 that is at least partially inclined.

In some other embodiments, the lower base portion 100 may be configured to have an upper surface that is at least partially curved, not in the form of a ball unit 140, and in contact with the lower surface of the upper base portion 200. For example, the curved surface of the lower base portion 100 may be provided as a curved surface protruding upwards and having a predetermined curvature. In this case, the lower surface of the upper base portion 200 may be configured to have a hollow curved surface with a predetermined curvature that is smaller than that of the protruding curved surface. With the upper base portion 200 and the lower base portion 100 kept together at the center axis by the central support member 150, the upper base portion 200 may tilt on the lower base portion 100 due to the curvature difference.

In another exemplary embodiment, the lower base portion 100 may have a curved surface, not in the form of a ball unit 140, provided as a hollow curved surface having a predetermined curvature. In this case, the lower surface of the upper base portion 200 may be configured to have a protruding curved surface protruding downwards towards the hollow curved surface with a predetermined curvature that is larger than that of the hollow curved surface. With the upper base portion 200 and the lower base portion 100 kept together at the center axis by the central support member 150, the upper base portion 200 may tilt on the lower base portion 100 due to the curvature difference.

Referring to FIG. 4, the upper base portion 200 may further include a first position guide 250 and a second position guide 260. As mentioned above, the lower base plate 110 may include a first position hole 180 and a second position hole 190 in which the first position guide 250 and the second position guide 260 may be accommodated, respectively. These position guides 250 and 260 may be formed to protrude downwards from the upper base portion 200, and may be formed to be accommodated at least partially in the position holes 180 and 190. Preferably, the position guides 250 and 260 may be cylindrical posts with smaller diameters than the position holes 180 and 190 such that the position guides 250 and 260 have enough space to tilt without bumping into the edges of the position holes 180 and 190. Thus, along with the protrusions 170 at each corner of the lower base plate 110 protruding upwards, the position guides 250 and 260 protruding downwards from the upper base plate 210 may further assist in keeping the lower base portion 100 and the upper base portion 200 aligned. This way, when the thermal module 300 is moved along a front-rear direction in a drawer-like manner for placing the sample plate 20 onto the thermal module 300, due to the position guides 250 and 260 and protrusions 170, the lower base portion 100 and the upper base portion 200 may be kept aligned in a stable manner.

Figure 5:
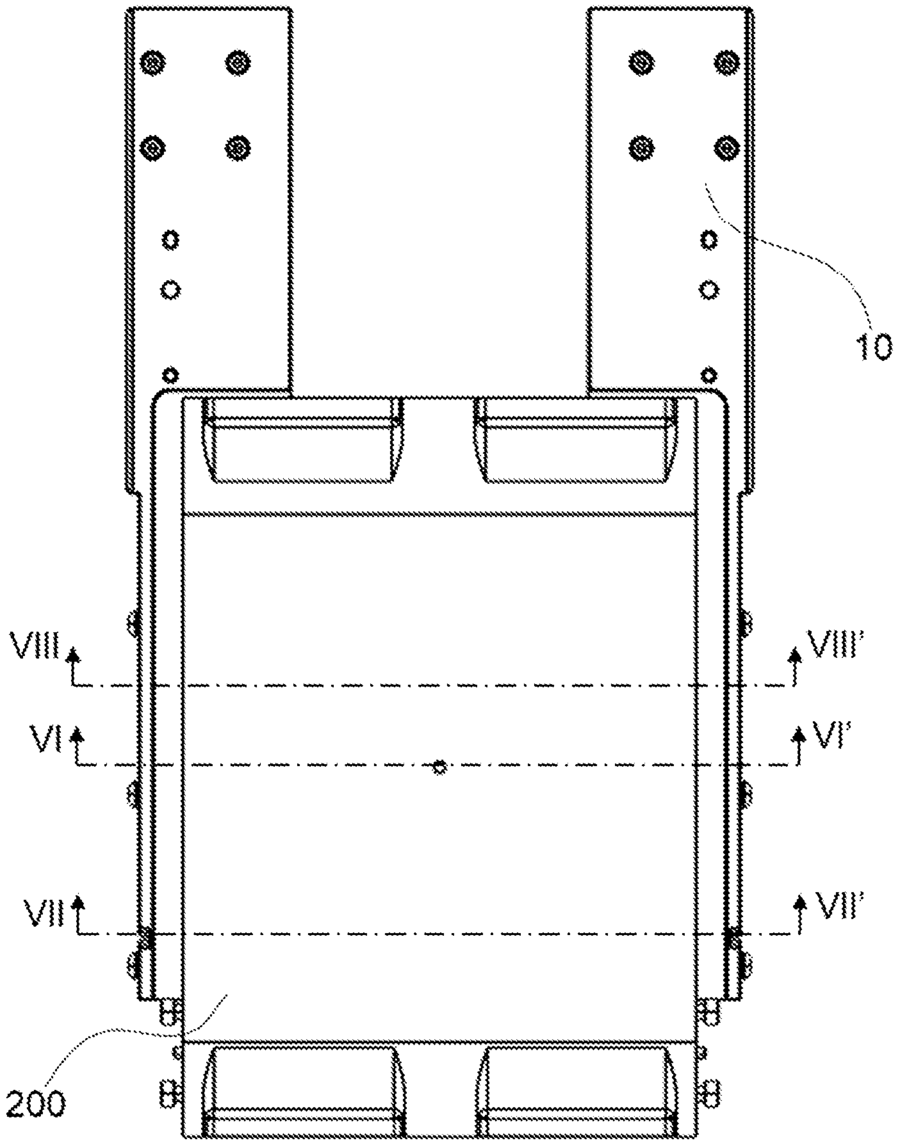
FIG. 5 is a top view illustrating the base structure and floor portion according to an embodiment of the present disclosure and indicating section lines VI-VI', VII-VII', and VIII-VIII'.

In FIGS. 5 to 8, a base structure according to an above-mentioned embodiment of the present is shown. FIG. 5 is a top view illustrating the base structure and floor portion 10 according to an embodiment of the present disclosure and indicating section lines VI-VI', VII-VII', and VIII-VIII'.

As shown in FIG. 5, when the base structure is viewed from the top, the upper base portion 200 covers the lower base portion 100. The floor portion 10 may be formed under the lower base portion 100 to support the sides of the lower base portion 100, but is not limited to the shaped shown in FIG. 5. The floor portion 10 formed as two long blocks would be advantageous for supporting the base structure as well as the thermal module 300 especially for an apparatus having a drawer-like configuration for moving the thermal module 300 along a front-rear direction.

FIG. 6 shows a view of the configuration and exemplary arrangement of the upper base portion 200, lower base portion 100, and the floor portion 10. FIG. 6 is a cross-sectional view taken along line VI-VI' in FIG. 5. According to an embodiment of the present disclosure, the central support member 150 may be disposed along the center axis C of the lower base portion 100 and the upper base portion 200. The central support member 150 may include a central fastening member 151, a support body 152, and an aligning member 153. The central fastening member 151 may be engaged to the support body 152 on one end and be fixed to the upper base plate 210 on the other.

The aligning member 153 may be a coil spring disposed within the center hole 120 of the lower base plate 110. As shown in FIG. 6, the center hole 120 may be formed penetrating through the lower base plate 110, but with a larger space formed at the lower part of the lower base plate 110. That is, the center hole 120 may have a larger opening at the bottom of the lower base plate 110 than at the top of the lower base plate 110. The top surface of the lower base plate 110 surrounding the center hole 120 may have an edge that protrudes radially inward towards the center axis C. The aligning member 153 may be disposed between the edge of the center hole 120 and a protruding edge of the support body 152.

The support body 152 may have a fixed end and a free end, wherein the fixed end may be fixed or fitted to the bottom of the upper base portion 200, more particularly to the central insertion 220 of the upper base portion 200. The central insertion 220 may be configured to be inserted in the center hole 120, and preferably may be formed to have a diameter small enough relative to the center hole 120 such that as the upper base plate 210 tilts, the central insertion 220 is not restricted from moving. That is, as the upper base plate 210 tilts, the central insertion 220 moves accordingly, which also causes the central fastening member 151 and the support body 152 to tilt. The aligning member 153 disposed between the protruding edge of the support body 152 and the edge of the center hole 120 counteracts the applied pressure at least partially. The elasticity of the aligning member creates tension between the upper base portion 200 and the lower base portion 100 which acts to eventually bring the upper base portion 200 to an optimal leveled state where pressure is evenly distributed on the sample plate 20.

As shown in FIG. 6, the first position guide 250 and the second position guide 260 may be at least partially enclosed by the first position hole 180 and the second position hole 190, respectively. As mentioned above, the position guides 250 and 260 may be cylindrical posts with smaller diameters than the position holes 180 and 190 such that the position guides 250 and 260 have enough space to tilt without bumping into the edges of the position holes 180 and 190.

Figure 7:
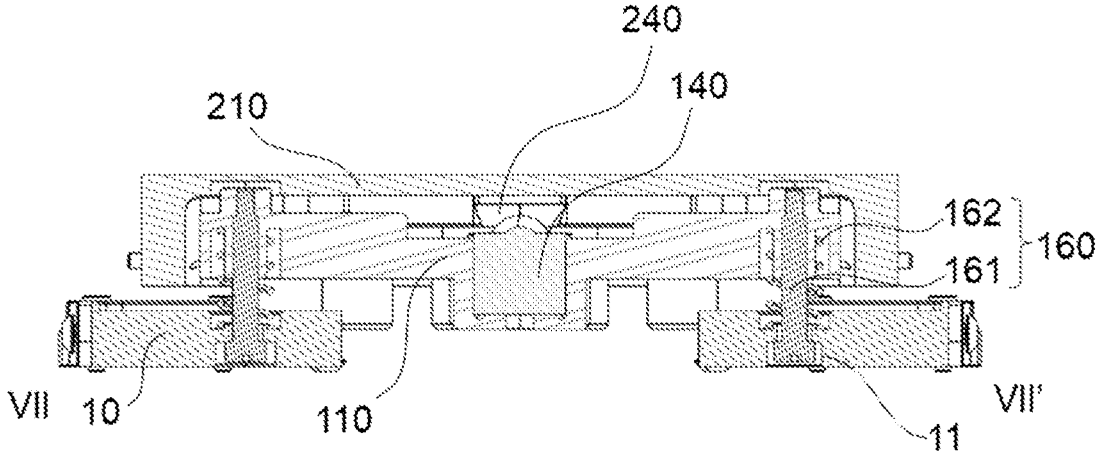
FIG. 7 is a cross-sectional view taken along line VII-VII' in FIG. 5.

FIG. 7 shows the configuration and arrangement of a spacer 160 according to an embodiment of the present disclosure. FIG. 7 is a cross-sectional view taken along line VII-VII' in FIG. 5. As shown in FIG. 7, spacers 160 may be provided between the lower base plate 110 and the floor portion 10. The lower base plate 110 may be supported by the spacers 160, each of the spacers 160 for adjusting a distance between the lower base portion 100 and the floor portion 10.

As previously mentioned, the spacers 160 may each include: a fastening member 161 connected to the lower base portion 110 and configured to engage the floor portion 10, and an elastic member 162 provided between the lower base portion 110 and the floor portion 10 for elastically supporting the lower base portion. A spacer 160 may be provided for each corner of the lower base plate 110.

As shown in FIG. 7, the fastening member 161 may be a screw that can be tightened on to the lower base plate 110 to shorten the distance between the floor portion 10 and the lower base plate 110. On the other hand, the fastening member 161 may be loosened from the lower base plate 110 to increase the distance between the floor portion 10 and the lower base plate 110. Meanwhile, the elastic member 162 may be a coil spring that keeps the floor portion 10 spaced apart from the lower base plate 110, but allows the distance between the floor portion 10 and the lower base plate 110 to deviate to some extent depending on the pressure applied thereto.

The floor portion 10 may be provided with spacer receiving portions 11 configured to enclose spacers 160 at least partially. The spacer receiving portion 11 may include a recess where the elastic member 162 is at least partially accommodated, and a hole in which the fastening member 161 may pass through. The elastic member 162 may be seated on and supported by the surface of the recess of the spacer receiving portion 11, and the protruding edge of the fastening member 161, in this case, the head of the screw, may engage with the hole of the spacer receiving portion 11.

As mentioned previously, due to such configuration, when the floor portion 10 and the lower base plate 110 are pushed apart from each other via the elastic member 162, the protruding edge engages with the lower surface of the spacer receiving portion 11, which prevents the fastening member 161 from falling out of the hole of the spacer receiving portion 11. Meanwhile, when the floor portion 10 and the lower base plate 110 are pressed together, the elastic member 162 may be compressed and the fastening member 161 may pass through the hole of the spacer receiving portion 11. Then, the lower base plate 110 is moved upward again by the elasticity of the elastic member 162, consequently providing a damping mechanism for the thermal module 300.

Figure 8:
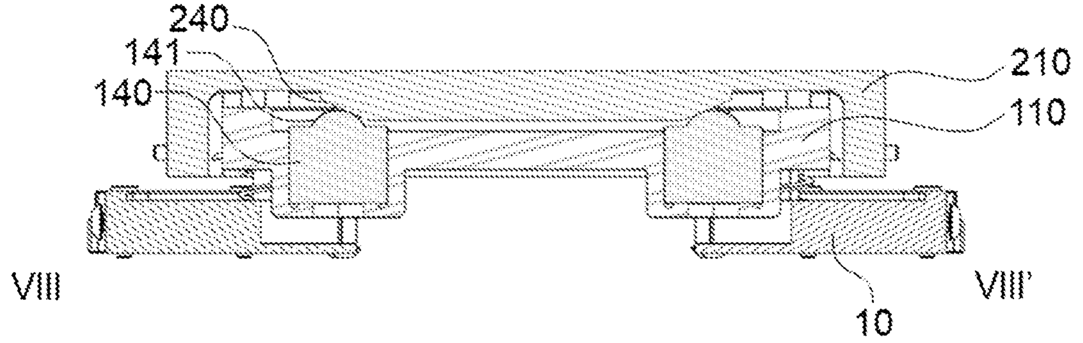
FIG. 8 is a cross-section view taken along line VIII-VIII' in FIG. 5.

FIG. 8 is a cross-section view taken along line VIII-VIII' in FIG. 5. As shown in FIG. 8 and also as mentioned previously, a ball unit 140 may be embedded in the lower base plate 110, and a sloped surface 240 may be formed on the lower surface of the upper base plate 210. More particularly, the sloped surface 240 of the upper base plate 210 is in contact with the curved surface 141 of the ball unit 140, and in the present embodiment where there are three ball units 140, each of the ball units 140 may be in contact with a sloped surface 240 at a point. Thus, the upper base plate 210 may tilt by sliding against the curved surface 141 of the ball unit 140 along the sloped surface 240. Although not the curved surface 141 and the sleeve 142 is not distinguished in the cross-section view of FIG. 8, the ball unit 140 may be a conventional ball type bearing. That is, a spherical ball having the curved surface 141 may roll within the sleeve 142 to reduce any friction that may occur during the sliding movement of the sloped surface 240 of the upper base plate 210.

As described above, a sample analyzing apparatus may be configured to have a base structure according to an embodiment of the present disclosure, used together with a nucleic acid amplifier having a thermal module configured to hold a plurality of reaction vessels. The plurality of reaction vessels may be a sample plate which is pressed against the thermal module. As the sample plate is pressed against the thermal module, the thermal module may tilt due to uneven alignment between the thermal block of the thermal module and the sample plate. Initially, the upper base portion supporting the thermal module may tilt accordingly with the thermal module, but due to the central support member and its aligning member that exerts counterforce, the upper base portion may tilt back with respect to the lower base portion. Consequently, automatic leveling of the thermal module and sample plate is achieved, which improves uniform temperature control while force is applied evenly over the sample plate.

What is claimed is:

1. A sample analyzing apparatus comprising, a thermal module configured to hold a plurality of reaction vessels; and a base structure for automatically balancing the thermal module, wherein the base structure comprises:

an upper base portion for supporting the thermal module;

a lower base portion aligned with the upper base portion at a center axis via a central support member comprising an aligning member and a support body for holding the aligning member in place, the central support member configured to keep the upper base portion and the lower base portion together; and a floor portion disposed under the lower base portion, wherein the lower base portion is supported by spacers, each spacer for adjusting a distance between the lower base portion and the floor portion, wherein the spacer comprises an elastic member provided between the lower base portion and the floor portion for elastically supporting the lower base portion, wherein the upper base portion is tiltable with respect to the lower base portion, and the upper base portion tilts to a leveled state as the upper base portion and the lower base portion are pressed together as a platform of the thermal module presses down on the plurality of reaction vessels, wherein the lower base portion or the upper base portion comprises a plurality of ball units embedded therein, the plurality of ball units being evenly spaced from each other around the center axis.

2. The apparatus of claim 1, wherein the aligning member exerts counterforce that partially counteracts a force that causes the upper base portion to tilt.

3. The apparatus of claim 1, wherein the aligning member is a spring coil.

4. The apparatus of claim 1, wherein the support body has a fixed end and a free end, the fixed end of the support body fixed to any one of the upper base portion or the lower base portion, and the free end of the support body holding the aligning member such that the counterforce is exerted on the other one of the upper base portion or the lower base portion.

5. The apparatus of claim 4, wherein the free end of the support body has a protruding edge for holding the aligning member.

6. The apparatus of claim 1, wherein the upper base portion has a lower surface that is at least partially inclined downwards towards the center axis.

7. The apparatus of claim 6, wherein the lower base portion has an upper surface that is at least partially curved and in contact with the lower surface of the upper base portion.

8. The apparatus of claim 6, wherein the plurality of ball units are embedded in the lower base portion, such that the plurality of ball units are in contact with the lower surface of the upper base portion.

9. The apparatus of claim 8, wherein the plurality of ball units are in contact with the lower surface of the upper base portion that is at least partially inclined.

10. The apparatus of claim 1, wherein the lower base portion has an upper surface that is at least partially inclined upwards towards the center axis.

11. The apparatus of claim 10, wherein the upper base portion has a lower surface that is at least partially curved and in contact with the upper surface of the lower base portion.

12. The apparatus of claim 10, wherein the plurality of ball units are embedded in the upper base portion, such that the plurality of ball units are in contact with the upper surface of the lower base portion.

13. The apparatus of claim 12, wherein the plurality of ball units are in contact with the upper surface of the lower base portion that is at least partially inclined.

14. The apparatus of claim 1, wherein the spacers each further comprises a fastening member connected to the lower base portion and configured to engage the floor portion.

15. The apparatus of claim 1, wherein the upper base portion comprises a position guide, and the lower base portion comprises a position hole in which the position guide is at least partially enclosed.

16. The apparatus of claim 1, wherein the upper base portion comprises a first position guide and a second position guide, and the lower base portion comprises a first position hole and a second position hole, the first and second position guides at least partially enclosed by the first and second position holes, respectively.

* * * * *